United States Patent [19]
Albrecht et al.

[11] 3,961,767
[45] June 8, 1976

[54] VEHICLE BUCKET SEAT APPARATUS AND ASSEMBLY METHOD THEREFOR

[75] Inventors: William C. Albrecht, Warren; David L. Clark, Grosse Pointe Woods, both of Mich.

[73] Assignee: General Motors Corporation, Detroit, Mich.

[22] Filed: June 11, 1975

[21] Appl. No.: 585,840

[52] U.S. Cl. ................................. 248/503; 248/25
[51] Int. Cl.² ........................ A62B 35/00; B65J 1/22
[58] Field of Search .............. 29/526; 105/463, 464; 248/1, 2, 14, 19, 25, 223, 429, 430, 500–510; 296/63

[56] References Cited
UNITED STATES PATENTS

| | | | |
|---|---|---|---|
| 311,854 | 2/1885 | Roush | 248/502 |
| 2,323,153 | 6/1943 | Pilson | 248/19 |
| 2,904,287 | 9/1959 | Ertsgaard et al. | 248/25 |
| 3,388,885 | 6/1968 | Holmes | 248/500 X |
| 3,899,151 | 8/1975 | Kobrehel | 248/429 |

FOREIGN PATENTS OR APPLICATIONS

| | | | |
|---|---|---|---|
| 74,927 | 1945 | Czechoslovakia | 248/19 |
| 953,967 | 1949 | France | 248/2 |
| 1,079,959 | 1954 | France | 248/506 |
| 831,879 | 1960 | United Kingdom | 248/430 |

*Primary Examiner*—Roy D. Frazier
*Assistant Examiner*—Lawrence J. Staab
*Attorney, Agent, or Firm*—John P. Moran

[57] ABSTRACT

A vehicular bucket seat arrangement adapted to being readily assembled into a vehicle body, the apparatus including an anchor bracket mounted on the floor of the underbody adapted to receive into one side thereof a locator bracket operatively connected to the inboard seat adjustment track, and a pair of mounting flanges operatively connected to the outboard seat adjustment track and adapted to being secured to the rocker panel portion of the underbody once the locator bracket has been pivotally force-fitted into the anchor bracket.

4 Claims, 5 Drawing Figures

VEHICLE BUCKET SEAT APPARATUS AND ASSEMBLY METHOD THEREFOR

The invention relates generally to automotive bucket seats and, more particularly, to mounting arrangements therefor.

Heretofore, bucket seats have been mounted by setting same into a predetermined location on the floor of the underbody, bolting same down at the front or rear mounting brackets thereof, then adjustably moving the seat in a direction leading over the bolts just installed to uncover the remaining rear or front mounting brackets and, thence, bolting down the latter. While this method is satisfactory, it is desirable to have a more readily accessible and faster method of assembling bucket seats, with apparatus therefor which is totally reliable once installed.

Accordingly, an object of the invention is to provide an improved automotive bucket seat mounting apparatus and method of assembling same.

Another object of the invention is to provide an automotive bucket seat with improved mounting means therefor, the resultant seat assembly being adaptable to being inserted over the vehicular rocker panel, pivoted into its desired location on the floor of the underbody, and secured permanently thereon by fastening two bolts on the outboard edge thereof adjacent the rocker panel.

A further object of the invention is to provide a vehicular bucket seat arrangement adapted to being readily assembled into a vehicle body, the apparatus including an anchor bracket mounted on the floor of the underbody adapted to receive into one side thereof a locator bracket operatively connected to the inboard seat adjustment track, and a pair of mounting flanges operatively connected to the outboard seat adjustment track and adapted to being secured to the rocker panel portion of the underbody once the locator bracket has been pivotally force-fitted into the anchor bracket.

These and other objects and advantages of the invention will be apparent when reference is made to the following description and accompanying drawings, wherein.

Figure 1:
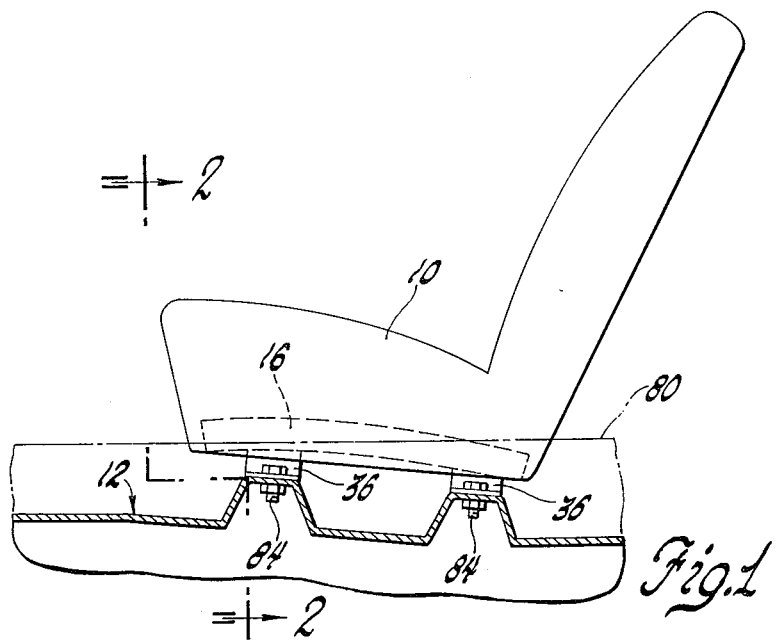
FIG. 1 is a side view, in partial cross-section of a bucket-type automotive seat mounted on a vehicular underbody in accordance with the teachings of the invention.

Referring now to the drawings in greater detail, FIG. 1 illustrates an automotive bucket-type seat 10 mounted on a vehicular underbody 12 in a manner to be described.

Figure 2:
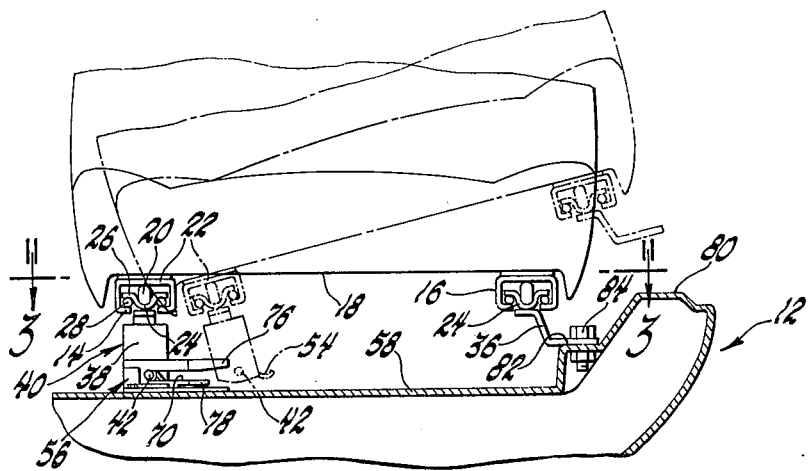
FIG. 2 is a cross-sectional view taken along the plane of line 2—2 of FIG. 1, and looking in the direction of the arrows.
Figure 4:
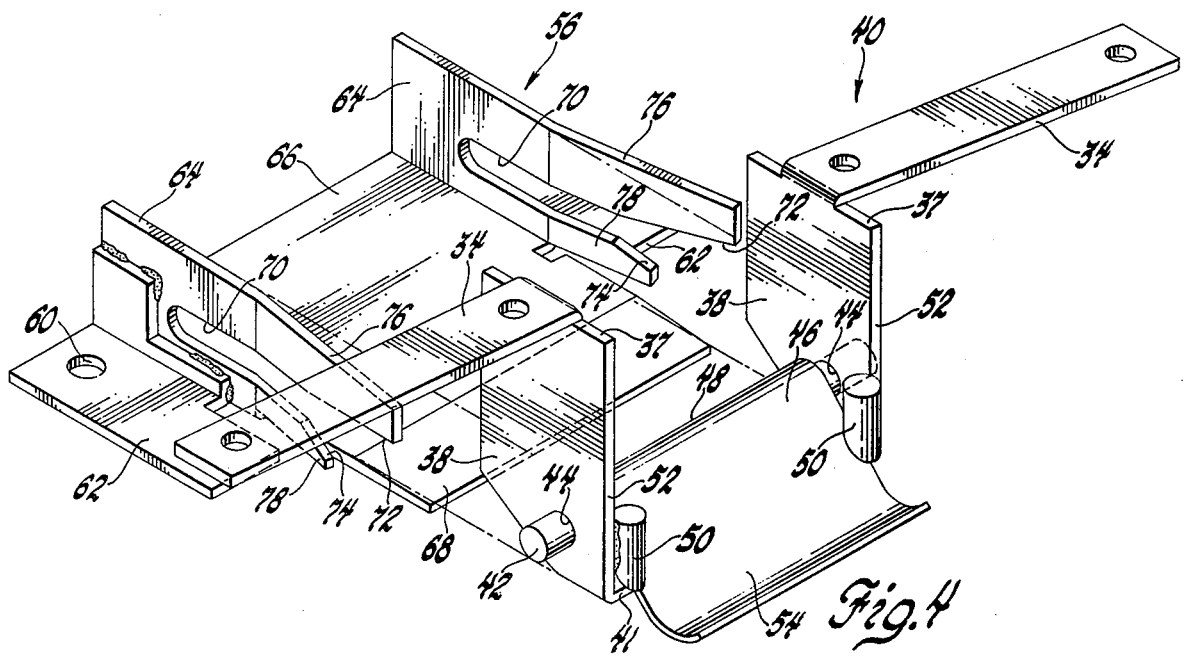
FIG. 4 is an enlarged, exploded, perspective view of two of the components shown in FIGS. 2 and 3, in an unassembled state.
Figure 5:
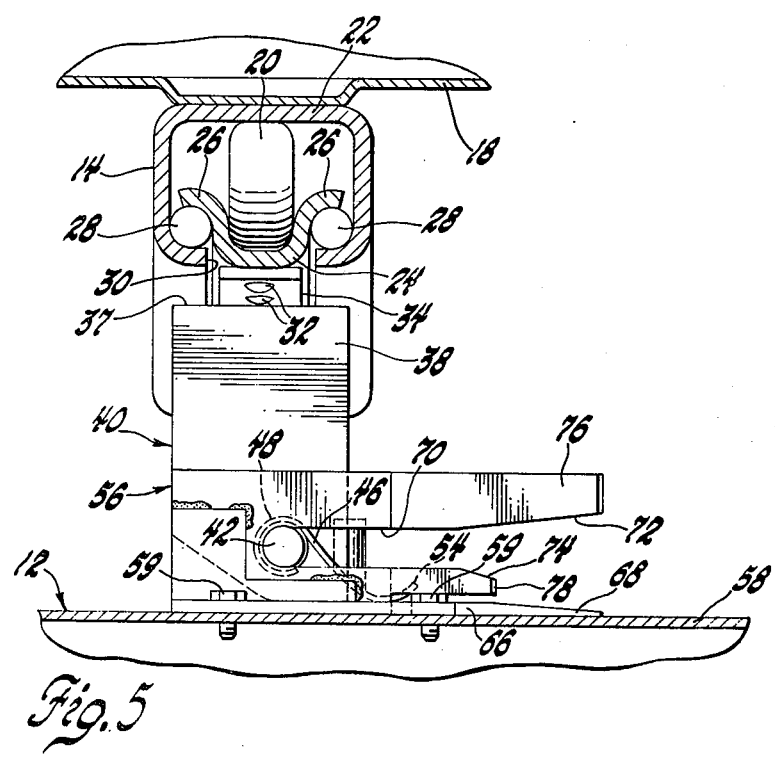
FIG. 5 is an enlarged view of a portion of the FIG. 2 structure in an assembled state.

As shown in FIG. 2, a pair of inboard and outboard seat adjustment channels 14 and 16, respectively, are secured to the bottom surface 18 of the seat 10, the inboard channel 14 being shown enlarged in FIG. 5. The channels 14 and 16 are adapted to being adjusted forwardly or rearwardly in the usual manner by virtue of roller 20 (FIG. 5) mounted between the upper wall 22 thereof and a U-shaped track 24 supported by flanges 26 on a pair of rods 28 retained along the lower corners of each channel 14 and 16. The bottom surface of the U-shaped track 24 extends through a longitudinal opening 30 formed along the bottom of each channel 14 and 16. The track 24, mounted in the inboard channel 14, is secured by bolts or rivets 32 to spaced-apart straps 34, while the track 24, mounted in the outboard channel 16, is secured in any suitable manner to mounting flanges 36 (FIG. 2), for a purpose to be described. The straps 34 are formed on the upper edges 37 of vertical wall members 38 of a locator bracket assembly 40 so as to extend in opposite directions therefrom, as shown in FIG. 4. The vertical wall members 38 are formed on oppositely disposed edges of a bottom plate 41.

A rod 42 is mounted through axially aligned openings 44 formed in the vertical wall members 38, extending a predetermined distance beyond each of the wall members 38. A contoured or inverted S-shaped plate member 46 has one end 48 (FIG. 5) thereof mounted around the rod 42 intermediate the vertical wall members 38. A stop member 50 is secured adjacent a vertical edge 52 of each vertical wall member 38 in a predetermined relationship with the extension therepast of the contoured end portion 54 of the plate member 46.

A receiver or anchor bracket assembly 56 is secured to the floor 58 of the underbody 12 by bolts 59 (FIG. 5) mounted through openings 60 (FIG. 4) formed in mounting flanges 62 welded to respective side walls 64 formed on a base plate member 66. A sloped entrance ramp 68 is formed on the front portion of the base plate member 66. Longitudinal slots 70 are formed in the side walls 64, suitable for the reception therein of the extended ends of the rod 42. The rod 42 is piloted into the slots 70 by oppositely disposed chamfers 72 and 74 formed adjacent the ends of respective upper and lower extensions 76 and 78 (FIG. 4) formed on the side walls 64. The extensions 76 and 78 are bent slightly outwardly from the respective planes of the side walls 64 to serve to pilot the vertical wall members 38 of the locator bracket assembly 40 therebetween.

Figure 3:
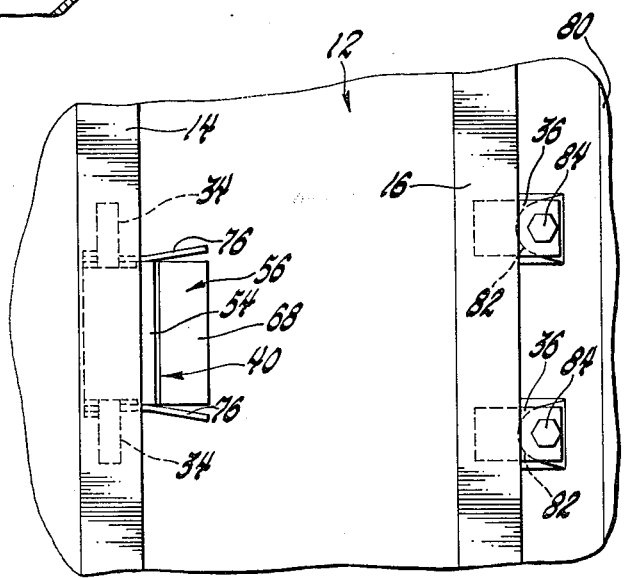
FIG. 3 is a cross-sectional view taken along the plane of line 3—3 of FIG. 2, and looking in the direction of the arrows.

As may be noted in FIGS. 2 and 3, assembly of the bucket seat 10 onto the vehicular underbody 12, while the vehicle is traveling along an assembly line, for example, is accomplished very simply by inserting the seat 10 through a vehicular front door frame [not shown], over the outboard rocker panel 80 of the underbody 12, tilting it downwardly at the inner side thereof so as to slide the rod 42 into the inlet formed by the chamfers 72 and 74 of the pair of extensions 76 and 78, and thence into the slots 70, the contoured end portion 54 of the plate member 46 sliding over the ramp 68 and force-fitted between the base plate member 66 and the stop members 50, the vertical wall members 38 being confined between the side walls 64.

Once the rod 42 extensions abut against the respective ends of the slots 70, the mounting flanges 36 will have seated on flat mounting surfaces 82 formed intermediate the floor 58 of the underbody 12 and the top of the rocker panel 80. Bolts 84 are then inserted through suitable openings formed in the respective flanges 36 and the flat mounting surfaces 82 to permanently secure the seat 10 within the automotive body, ready for slidable fore-and-aft adjustment along the tracks 24.

It should be apparent that the invention provides an improved seat apparatus which is simple, sturdy, and adapted to being readily and quickly installed in a vehicular body during the final assembly process.

While but one embodiment of the invention has been shown and described, other modifications thereof are possible.

We claim:

1. For use with an automotive underbody including a floor and a rocker panel, and with an automotive bucket seat having inboard and outboard channels and associated adjustment rollers and tracks operatively connected thereto, a seat mounting arrangement comprising an anchor bracket assembly secured to said floor; a locator bracket assembly secured to the inboard adjustment track; and a pair of mounting flanges secured to the outboard adjustment track; said anchor bracket assembly including a base plate member, side walls formed on opposite edges of said base plate member, horizontal open-ended aligned slots formed in each of said side walls, pilot means formed adjacent the open end portion of said open-ended slots, and mounting means operatively connected to said side walls and/or said base plate member for securing said anchor bracket assembly to said floor; said locator bracket assembly including a bottom plate, vertical wall members formed on opposite edges of said bottom plate, aligned openings formed through said vertical wall members, a rod mounted in said aligned openings and having the ends thereof extended beyond said openings and adapted to being piloted by said pilot means into said respective horizontal open-ended slots, resilient means operatively connected to said rod and adapted to cause said rod-ends to be securely mounted in said respective open-ended slots, and mounting straps formed on the upper edges of said vertical wall members and secured to said inboard adjustment track; and said pair of mounting flanges on said outboard adjustment track being secured to a pair of mounting surfaces formed at a predetermined location on an inboard side of said rocker panel.

2. For use with an automotive underbody including a floor and a rocker panel, and with an automotive bucket seat having inboard and outboard channels and associated adjustment rollers and tracks operatively connected thereto, a seat mounting arrangement comprising an anchor bracket assembly secured to said floor; a locator bracket assembly secured to the inboard adjustment track; and a pair of mounting flanges secured to the outboard adjustment track; said anchor bracket assembly including a base plate member, side walls formed on opposite edges of said base plate member, horizontal open-ended aligned slots formed in each of said side walls, upper and lower oppositely chamfered extension members formed on each of said side walls, serving to extend said horizontal slots, said chamfered extension members being bent slightly outwardly from the planes of the respective side walls, an entrance ramp formed on an end of said base plate member intermediate said chamfered extension members, and mounting flanges formed on said side walls and secured to said floor; said locator bracket assembly including a bottom plate, vertical wall members formed on opposite edges of said bottom plate, aligned openings formed through said vertical wall members, a rod mounted in said aligned openings and having the ends thereof extended beyond said openings and adapted to being piloted by said chamfered extension members into said respective horizontal open-ended slots, a contoured plate member mounted on said rod and extending beyond said bottom plate, a stop member formed on an edge of each vertical wall member above the extension of said contoured plate member, said contoured plate member being distorted to fit tightly between said stop members and said base plate member to eliminate rattle between said anchor bracket and said locator bracket assemblies, and mounting straps formed on the upper edges of said vertical wall members and secured to said inboard adjustment track; and said pair of mounting flanges on said outboard adjustment track being secured to a pair of flat mounting surfaces formed at a predetermined location on an inboard side of said rocker panel.

3. A method of assembling a bucket seat having inner and outer cooperating channels and tracks secured to the bottom surface thereof in an automotive body, onto the floor and rocker panel thereof, the rocker panel having a pair of spaced-apart flat mounting surfaces formed thereon, said assembly method comprising:

a. forming an anchor bracket assembly including a base plate member having vertical walls formed on two sides thereof, an open-ended horizontal slot formed in each of said vertical walls, and piloting means formed at the open end of each slot;

b. forming mounting flange means on said anchor bracket assembly and securing said anchor bracket assembly to a predetermined location on said floor via said mounting flange means;

c. forming a locator bracket assembly including a bottom plate slightly narrower than said base plate member of said anchor bracket assembly and having vertical walls higher than said vertical walls of said base plate member formed on two sides of said bottom plate, a rod extended across and beyond said vertical walls;

d. forming mounting straps on the upper edges of said vertical walls of said locator bracket assembly and securing same to the inboard track of said bucket seat;

e. forming a pair of sidewardly extending mounting flanges on the outboard track of said bucket seat spaced so as to match said flat mounting surfaces of said rocker panel;

f. inserting said locator bracket assembly into said anchor bracket assembly by sliding the extended portions of said rod into said piloting means and thence into said horizontal slots of said anchor bracket assembly; and g. securing said bucket seat by bolting said pair of mounting flanges to said flat mounting surfaces of said rocker panel.

4. A method of assembling a bucket seat having inner and outer cooperating channels and tracks secured to the bottom surface thereof in an automotive body, onto the floor and rocker panel thereof, the rocker panel having a pair of spaced-apart flat mounting surfaces formed thereon, said assembly method comprising:

a. forming an anchor bracket assembly including a base plate member having vertical walls formed on two sides theeof, an open-ended horizontal slot formed in each of said vertical walls, and upper and lower oppositely chamfered extension members formed on each of said walls serving to extend said horizontal slots, said extension members being spread slightly outwardly from the planes of the respective vertical walls;

b. forming mounting flange means on said anchor bracket assembly and securing said anchor bracket assembly to a predetermined location on said floor via said mounting flange means;

c. forming a locator bracket assembly including a bottom plate slightly narrower than said base plate member of said anchor bracket assembly and having vertical walls higher than said vertical walls of said base plate member formed on two sides of said bottom plate, a rod extended across and beyond said vertical walls, a contoured plate member mounted on said rod and trailing beyond said base plate member, and stop means formed on said vertical walls above said trailing portion of said contoured plate member;

d. forming mounting straps on the upper edges of said vertical walls of said locator bracket assembly and securing same to the inboard track of said bucket seat;

e. forming a pair of sidewardly extending mounting flanges on the outboard track of said bucket seat spaced so as to match said flat mounting surfaces of said rocker panel;

f. inserting said locator bracket assembly into said anchor bracket assembly by sliding the extended portions of said rod into said chamfered extension members and thence into said horizontal slots, said contoured plate member thereby becoming tightly confined between said stop means and said base plate member to prevent rattling between said anchor bracket and locator bracket assemblies; and g. securing said bucket seat by bolting said pair of mounting flanges to said flat mounting surfaces of said rocker panel.

* * * * *